(12) United States Patent
Starzak (10) Patent No.: US 6,440,600 B1
(45) Date of Patent: Aug. 27, 2002

(54) APPARATUS AND METHOD FOR GENERATING ELECTRICAL POWER FROM FLUID FLOW THROUGH CHARGED PORES

(76) Inventor: Michael E. Starzak, 609 Stonehedge Dr., Vestal, NY (US) 13850

( * ) Notice: Subject to any disclaimer, the term of this patent is extended or adjusted under 35 U.S.C. 154(b) by 0 days.

(21) Appl. No.: 09/541,961

(22) Filed: Apr. 4, 2000

Related U.S. Application Data (63) Continuation-in-part of application No. 09/074,500, filed on May 8, 1998, now abandoned.
(60) Provisional application No. 60/045,975, filed on May 8, 1997.

(51) Int. Cl.[7] .............................................. H01M 2/00
(52) U.S. Cl. ......................................... 429/80; 429/122
(58) Field of Search ................................. 425/6, 31, 41, 425/80, 121, 122, 128, 140, 163, 164, 165, 166, 168, 169

(56) References Cited

U.S. PATENT DOCUMENTS

| | | | |
|---|---|---|---|
| 3,706,894 A | 12/1972 | Tholome ..................... | 310/10 |
| 4,146,800 A | 3/1979 | Gregory et al. ............... | 290/44 |
| 4,159,426 A | 6/1979 | Staton ......................... | 290/44 |
| 4,191,806 A * | 3/1980 | Levy ............................ | 429/56 |
| 4,206,396 A | 6/1980 | Marks .......................... | 322/2 |
| 4,320,304 A | 3/1982 | Karlsson et al. .............. | 290/55 |
| 4,433,248 A | 2/1984 | Marks .......................... | 290/44 |
| 4,494,009 A | 1/1985 | Yukl ............................ | 290/55 |
| 5,626,983 A * | 5/1997 | Ekern et al. ................. | 429/166 |
| 6,080,501 A * | 6/2000 | Kelley et al. ................. | 429/31 |

OTHER PUBLICATIONS

Angrist, S., "Direct Energy Conversion", Allyn and Bacon, Boston, 1976, pp. 445–451.
C & E News, "Ion–Selective Membranes Metal nanotubules pass cations or anions", May 8, 1995, pp. 6–7.
Huang, M. et al., "Applications of a self–assembled bilayer coating on a fused–silica capillary surface for a capillary electrophoresis", *American Laboratory*, vol. 32, Oct. 1996, 4 pages.
Sigl, H. et al., "Assembly of polymer/lipid composite films on solids based on hairy rod LB–films", *Eur. Biophys. J.*, vol. 25, 1997, pp. 249–259.
Starzak, M., "Physical Chemistry of Membranes", Academic Press, Orlando, 1984, pp. 201–204.

* cited by examiner

Primary Examiner—Patrick Ryan
Assistant Examiner—Monique Wills
(74) Attorney, Agent, or Firm—Woodcock Washburn LLP (57) ABSTRACT

Apparatus and method for generating electrical energy from fluid flow comprising a conducting layer and an insulating layer for electrically insulating an electrolytic solution from the conducting layer. Pores extend through the conducting layer and the insulating exposing sections of the insulating layer within the pores. Exposed sections of the insulating layer within the pores carry a charge. A first electrode is connected with the conducting layer, while a second electrode is disposed to contact the electrolytic solution. A convertor is connected between the first and second electrodes. Fluid is flowed over the conducting layer and passed the pores to create a suction which draws charged species contained within the electrolytic solution into the pores, thereby producing a current. The convertor converts the current into electrical energy.

19 Claims, 5 Drawing Sheets

APPARATUS AND METHOD FOR GENERATING ELECTRICAL POWER FROM FLUID FLOW THROUGH CHARGED PORES

CROSS-REFERENCE TO RELATED APPLICATION

Priority is claimed herein under 35 U.S.C. §119(e) in the subject matter disclosed in U.S. Provisional Application Serial No. 60/045,975, entitled Electrical Energy from Fluid Flow in Capillaries with Charged Pores, filed on May 8, 1997, and under 35 U.S.C. §120 in the subject matter disclosed in U.S. patent application Ser. No. 09/074,500, filed on May 8, 1998, now abandoned, which is a continuation-in-part.

FIELD OF THE INVENTION

The present invention relates to an apparatus for and a method of generating electricity and, in particular, to an apparatus for and a method of using fluid flow to generate electrical energy.

BACKGROUND OF THE INVENTION

Wind energy is normally converted into electrical energy by converting the energy in wind flow to the rotary motion of a mechanical device such as a windmill. The rotary motion is applied to an electrical generator to produce electrical power. The change from wind power to electrical energy involves intermediate mechanical stages, including feathering and gearing systems, that increase the cost and complexity of the device. Consequently, windmills are cost effective only in isolated areas or on wind farms in high wind regions. Therefore, the known windmills are seldom used on single family dwellings or small buildings.

In a similar manner, hydroelectric power uses the pressure of falling water to rotate a turbine that produces electrical energy. However, the mechanical transducers used require an appropriate dam site for extensive power generation. Therefore, hydroelectric power is also not appropriate or cost effective for single family dwellings.

In order to eliminate many of the limitations associated with the mechanical linkages used in traditional windmills and hydroelectric plants, devices for the direct conversion of wind power to electrical power have been proposed. In one such device, wind power is utilized to move charged droplets entrained in the wind from a charging electrode to electrical ground. In another device, charged particles entrained in a wind are moved by the wind against an electrostatic potential. However, both of the previously known devices require complicated systems to continually produce the charged species. Further, large wind cross sections are necessary to utilize the energy in the low density gas.

In light of the foregoing, an apparatus and method for efficiently generating electrical energy from fluid flow would be highly beneficial. The apparatus and method should allow for the conversion of fluid flow to electrical energy while minimizing, or eliminating, the mechanical linkages that increase the cost and decrease the reliability of the known devices. Additionally, the apparatus and method should produce maximal transduction per unit wind cross sectional area in order to limit the overall size of the apparatus for effective use on smaller buildings. Further, the apparatus and method should be able to utilize either a compressible fluid (i.e., air) or an incompressible fluid (i.e., water). In addition, the apparatus should be closed so that any charge moved in order to generate the electrical energy remains in the apparatus for reuse. Preferably, the apparatus is also lightweight, economical, and environmentally friendly.

SUMMARY OF THE INVENTION

The problems associated with the known devices are overcome to a large extent by an apparatus in accordance with the present invention. The present invention uses the motion of charged particles or counterions relative to a fixed surface charge of opposite polarity to produce an electrical streaming potential and current. The counterion motion occurs in pores having the fixed surface charge, which are generally perpendicular to the motion of a fluid. The. counterions are caused to move into the pores by a pressure differential which is produced within the pores by the flow of the fluid over the pores.

In one of its aspects, the present invention comprises an apparatus for generating electrical energy. The apparatus comprises a generator and a convertor operatively connected to the generator via a first and a second electrode.

The generator comprises a conducting layer and an insulating layer for electrically isolating an electrolytic solution from the conducting layer. In one embodiment, the conducting layer and the insulating layer are formed as a generally planar sheet. Alternatively, the conducting layer and the insulating layer may be formed as a capillary tube or elongate tubular member. The generator may further comprise a receptacle for storing the electrolytic solution.

A plurality of pores or channels extend through both the conducting and the insulating layers. The pores form exposed sections of the conducting layer and the insulating layer within the pores. The exposed sections of the insulating layer are charged.

In one embodiment, the insulating layer is composed of a material having a surface charge and the charge is accordingly produced directly by the insulating layer. For example, the insulating layer can be composed of glass (silicon dioxide) that has acquired a net negative surface charge by treating the glass with base. Alternatively, the exposed sections of the conducting and insulating layers may be charged by, for example, coating those sections with a charged material. The technology of such charged surface coatings is extensively developed for coating glass or quartz capillaries in capillary electrophoresis. See, e.g., Altria, "Capillary Electrophoresis Guidebook" or Li, "Capillary Electrophoresis".

The convertor, along with the first and second electrodes, are connected to the generator for converting a current flowing through the conducting layer and the electrolytic solution into electrical energy. The first electrode is operatively connected with the conducting layer, while the second electrode is disposed to contact the electrolytic solution. Accordingly, the convertor is connected between the first and the second electrodes for converting the current flowing through the conducting layer and the electrolytic solution into electrical energy.

In another of its aspects, the present invention relates to a method for generating electrical energy. The method comprises the step of utilizing an insulating layer to electrically isolate an electrolytic solution comprising charged species from a conducting layer. A plurality of pores extend through both the conducting and the insulating layers.

Regions of the insulating layer, or regions of both the insulating and conducting layer, within the pores are formed with a charge having a polarity opposite to counterions of the electrolytic solution.

A fluid is then flowed over the conducting layer. The flow of the fluid creates a pressure differential within the pores which causes the charged species of the electrolytic solution to pass into the pores. The movement of the charged species past the charge on the exposed sections of the insulating and/or conducting layers creates a streaming potential and current which are converted into electrical energy.

BRIEF DESCRIPTION OF THE DRAWINGS

The foregoing summary, as well as the following detailed description of the preferred embodiments of the present invention, will be better understood when read in conjunction with the accompanying drawings, in which.

DETAILED DESCRIPTION OF THE PREFERRED EMBODIMENTS

Figure 1:
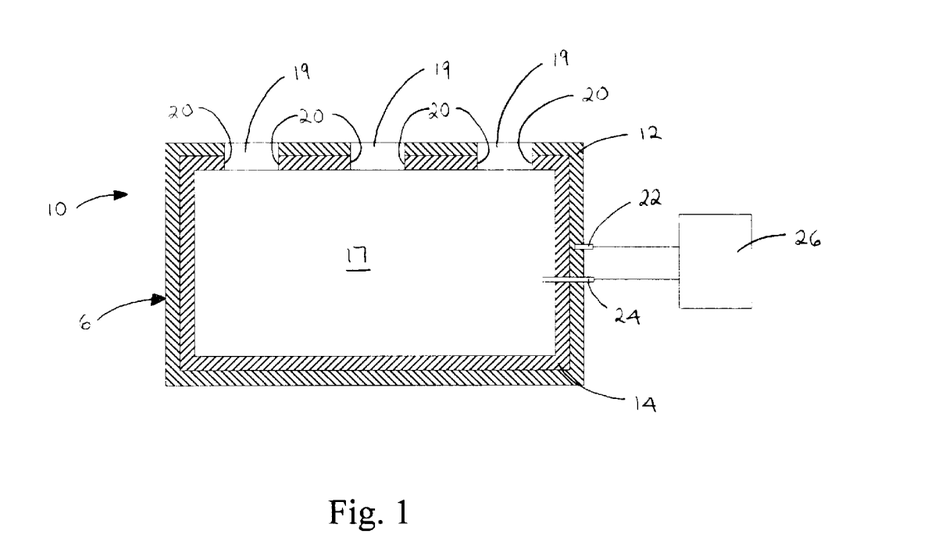
FIG. 1 is a schematic, cross-sectional view of an apparatus for generating electrical energy in accordance with the present invention.

An apparatus for generating electrical energy in accordance with the present invention is designated generally by the reference numeral 10 in FIG. 1. The apparatus 10 comprises a generator for generating an electrical current and a convertor for converting the electrical current into usable electric energy.

The generator comprises a conducting layer 12 made from a suitable material perforated with pores. For example, in one embodiment, the layer is an electrically or chemically formed metallic coating. An insulating layer 14 is disposed adjacent to the conducting layer 12 so as to generally cover a first surface of the conducting layer 12. The insulating layer 14 is made from a suitable insulating material that can be treated to produce a fixed surface charge on the walls of pores through the insulating layer. The apparatus 10 is placed in a moving stream of fluid. As the fluid flows over the conducting layer, the fluid flow causes charged particles or counterions from an electrolytic solution to move through pores within the insulating and conducting layers 12 and 14.

The movement of the charged particles within the pores establishes an electric potential, the streaming potential, between the electrolytic solution and the conducting layer and a flow of current therebetween, the streaming current.

In one embodiment, the lateral walls of glass capillaries are perforated with pores by coating the outer surface of the capillaries with wax, forcing holes through the wax to expose portions of the glass surface and etching the exposed portions of the glass surface with hydrofluoric acid to form pores through the capillary walls. Alternatively, a material having intrinsic pores, such as the precursor glass to Corning "Vycor" glass, is used as the insulating portion of the device. The conducting layer is then formed by chemical silvering using, for example, either the Brashear or Rochelle salt recipes found in older editions of the "Handbook of Chemistry and Physics". The pores through the insulating capillary are then continued through the silver layer by forcing acid through the pores in the insulator.

The conducting and insulating layers, 12 and 14, are shaped to form a receptacle 16 having an interior chamber 17 for holding the electrolytic fluid comprising a charged species or counterion. The receptacle 16 serves as a reservoir for the electrolytic solution and functions to recharge the apparatus 10 with the electrolytic solution. The receptacle 16 is formed such that the conducting layer 12 forms an outer surface of the receptacle 16 and the insulating layer 14 forms an inner surface of the receptacle 16. Accordingly, when the receptacle 16 is filled with the electrolytic solution, the insulating layer 14 functions to electrically isolate the conducting layer 12 from the electrolytic solution.

In one embodiment, an electrolyte of charged latex spheres available from companies such as Interfacial Dynamics Corporation are used in place of smaller electrolytic salts like sodium chloride. The spheres permit a large density of mobile charge to enter the pores and lower the total electrolytic solution conductivity to increase the efficiency of power conversion.

Pores 19 are formed in a two-dimensional array along a top face of the receptacle 16. The pores 19 extend through both the conducting and the insulating layers, 12 and 14. Accordingly, the pores 19 establish fluid communication between the interior chamber 17 of the receptacle 16 and the conducting layer 12. The pore geometry is preferably designed to minimize loss of electrolytic solution through the pores 19. A range of pore sizes, from mechanically produced (>1 mm) to microscopic, is contemplated as part of the invention. Accordingly, the pores 19 might be produced by alternate techniques. For example, mechanically produced pores with intrinsic charged surfaces can be formed in materials such as glasses. Alternatively, pilot paths or damage regions might be produced using high electric fields (electroporation) or by passing radiation through the material to produce damage tracks (see, e.g., Starzak—Encyclopedia of Physical Science and Technology). The tracks produced by either technique are then expanded to the desired diameter using an etching solution. Electroetching can be used to create pores.

Further, chemical techniques, such as ordered zeolite formation on a template, can be used to produce microscopic pores. Materials containing microscopic pores can be used to produce an embodiment with an exceptionally high "pore" density for maximal effectiveness.

Sections 20 of the insulating layer 14 are exposed within the pores 19. Since the insulating layer 14 is composed of a material which produces a fixed surface charge, the exposed sections 20 of the insulating layer 14 within the pores 19 carry a fixed charge.

A first electrode 22 is operatively connected to the conducting layer 12. A second electrode 24 is disposed within the interior chamber 17 of the receptacle 16 to contact the electrolytic solution when the electrolytic solution is contained within the receptacle 16. As shown in FIG. 1, the second electrode 24 extends through the conducting layer 12 and the insulating layer 14 into the interior chamber 17 of the receptacle 16. Although the second electrode 24 extends through the conducting layer 12, it will be appreciated that the second electrode 24 should be electrically insulated from the conducting layer 12 in order for the apparatus 10 to function properly.

A convertor 26 is connected between the first and the second electrodes, 22 and 24. Movement of the is charged species of the electrolytic solution within the pores 19 produces an electrical potential between the electrolytic solution and the conducting layer.

The convertor 26 functions to harness the electrical potential and convert that potential into usable electrical energy. In one embodiment, the convertor 26 comprises an inverter for converting high tension direct current into alternating current of a desired voltage and phase. However, other types of convertors, such as electrical storage and/or transmission devices which are well known to persons skilled in the art, can be utilized.

Figure 2:
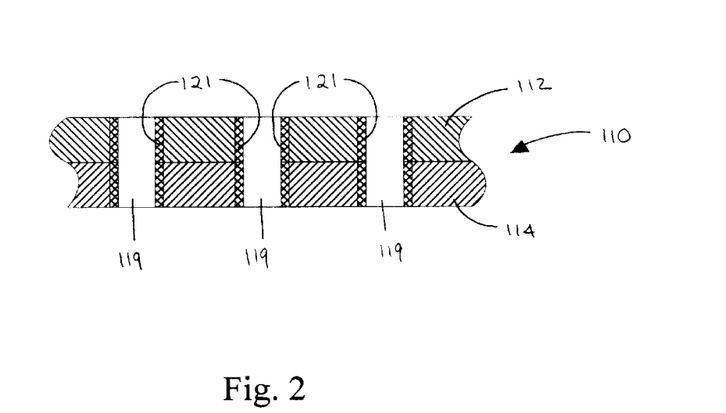
FIG. 2 is a schematic, partial, cross-sectional view of an alternate embodiment of the apparatus of FIG. 1.

An alternate embodiment of the apparatus in accordance with the present invention is depicted in FIG. 2. The apparatus 110, like the apparatus 10 of FIG. 1, comprises a generator which, in turn, comprises a conducting layer 112, an insulating layer 114, and a plurality of pores 119 extending through the conducting layer 112 and the insulating layer 114.

However, surfaces 121 of the conducting layer 112 and the insulating layer 114 which are exposed within the pores 119 are coated with a charged insulating material. For example pores 119 that are formed in situ via mechanical, chemical or electrical means can be coated with intrinsically charged chemicals that bind within the pores 119. Such coatings are well known, for example, in the field of capillary electrophoresis. Apparatus 110 is particularly suited for use with an insulating layer 114 that comprises a material which does not produce a surface charge.

Apparatus 110 is formed as a generally planar, bilayer sheet that separates the electrolytic solution from the moving fluid. The bilayer sheet has the insulating layer 114 facing the electrolytic solution and the conducting layer 112 facing the moving fluid to prevent a short circuit of the potential generated.

The relative size of the conducting and insulating layers, 112 and 114, depends on the materials used.

Figure 4:
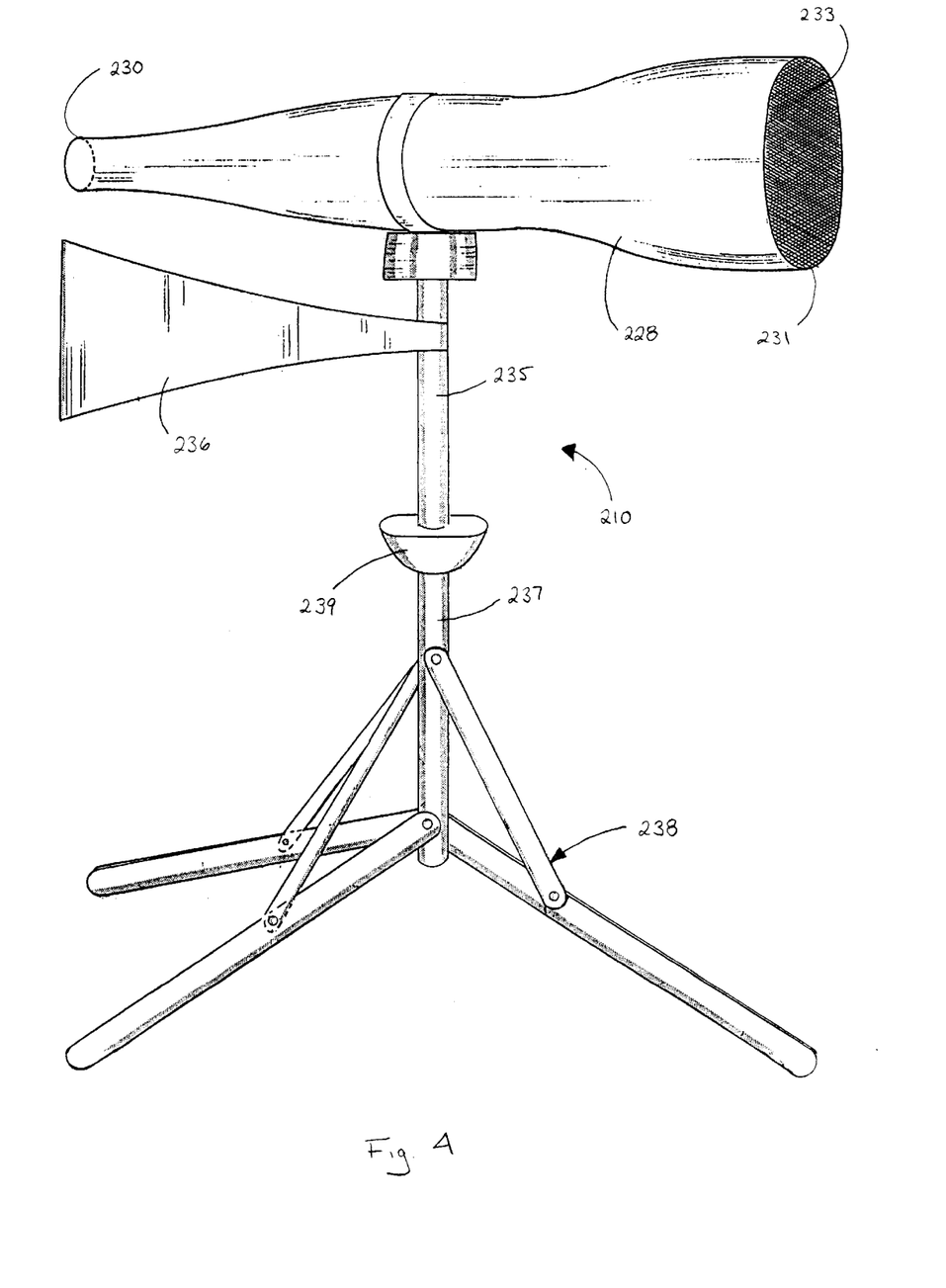
FIG. 4 is a perspective view of another alternate embodiment of the apparatus for generating electrical energy in accordance with the present invention.

Yet another alternate embodiment of the apparatus in accordance with the present invention is depicted in FIG. 4. In apparatus 210, fluid moves through long capillaries with an outer insulating layer and an inner conducting layer perforated with pores containing a fixed surface charge. Counterions are provided by an electrolytic solution bathing the external insulating wall of the capillary and are drawn into the pores by the pressure differential created by fluid moving past the internal wall of the capillary.

The apparatus 210 comprises a generally hollow housing 228 defining an interior cavity having a first and a second open end, 230 and 231 respectively. The apparatus is designed to be placed in a moving stream of fluid. The shape of the housing 228 is preferably selected to provide the longest convenient path for the fluid to flow through the interior cavity of the housing 228 and to maximize the velocity of the fluid passing through the housing 228. Toward that end, the second open end 231 of the housing 228 has a relatively large cross-sectional area to enable a large volume of fluid to enter the housing 228. Further, the exterior of the housing 228 is streamlined toward the first open end 230 of the housing 228 in order to lower the pressure exerted by fluid as it passes from the second end 231 of the housing 228 toward the first end 230 of the housing 228 over the exterior of the housing 228. The lower pressure of fluid passing over the exterior of the housing 228 near the first end 230 of the housing 228 facilitates fluid passing through the housing 228 to exit the housing 228 through the first open end 230 of the housing 228. A screen or mesh 233 is positioned over the second end 231 of the housing 228 to block larger particles (e.g., dust) from entering the interior of the housing 228. The housing 228 may further comprise a muffling system in the exhaust to reduce noise.

The housing 228 is mounted on a shaft 235 that contains a vane or other orientation device 236 to direct the second end 231 of the housing 228 upstream of the fluid flow and cause the fluid to flow through the interior of the housing 228. The shaft 235 is coupled to a stationary shaft 237 and mounting base 238 through a rotating mechanical coupler 239 with electrical contacts for the transfer of electrical power at all orientations.

Figure 5:
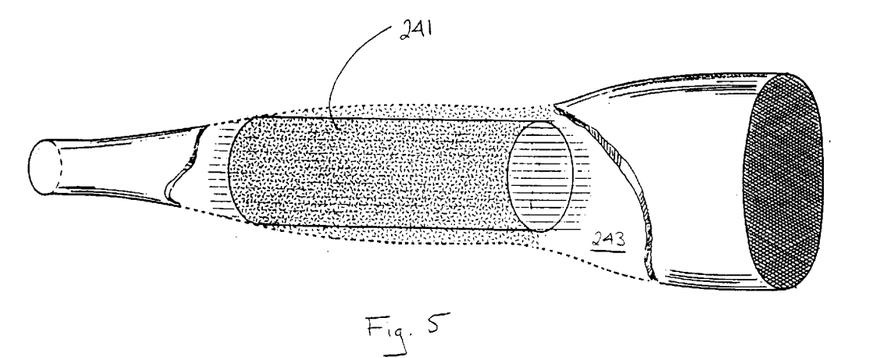
FIG. 5 is a perspective view of the housing of the apparatus depicted in FIG. 4 with a portion of the housing removed to expose the interior of the housing.

In one embodiment shown in FIG. 5, a cartridge 241 is contained within the interior cavity 243 of the housing 228. The net electrical potential for the apparatus 210 can be increased by coupling a plurality of cartridges 241 within a single housing 228. For example, multiple cartridges 241 can be connected in series to produce a larger output voltage if desired for subsequent power transfer, e.g., inversion. Additionally, the cartridges 241 may be designed for convenient removal and replacement.

Figure 6:
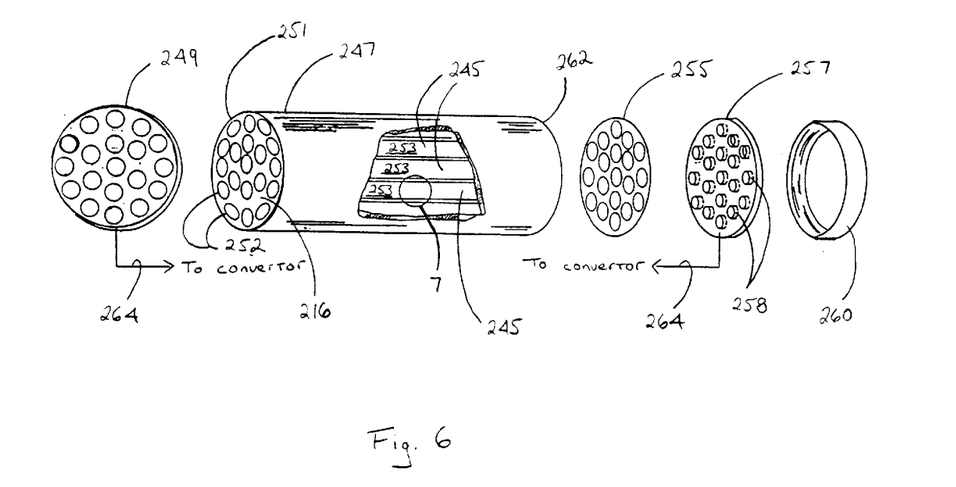
FIG. 6 is an exploded view of the cartridge of the housing depicted in FIG. 5 with a portion of a tubular section of the cartridge removed to expose the interior of the cartridge.

The cartridge 241, as shown in FIG. 6, comprises a plurality of capillaries or elongate tubular members 245 disposed within a generally tubular section 247. The elongate tubular members 245 are arranged within the tubular section 247 with the longitudinal axes of the elongate tubular members 245 parallel to the longitudinal axis of the housing 228.

Figure 7:
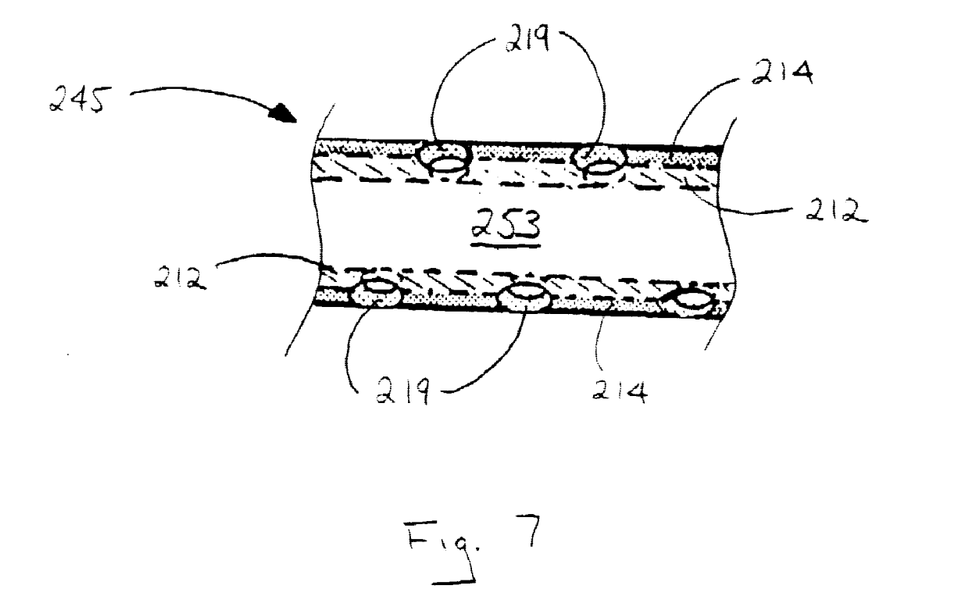
FIG. 7 is a cross-sectional view of the portion of the cartridge indicated by the circle labelled 7 in FIG. 6.

With reference to FIG. 7, each elongate tubular member 245 comprises a conducting layer 212 forming the interior surface of the elongate tubular member 245 and an insulating layer 214 forming the exterior surface of the elongate tubular member 245. A plurality of pores 219 extends through the conducting and the insulating layers, 212 and 214. Exposed sections 220 of the insulating layer 214 within the pores 219 are charged by a fixed surface charge as in apparatus 10. Alternatively, exposed sections of the conducting and insulating layers, 212 and 214, can be charged using a coating of charged insulating material as in apparatus 110.

Referring again to FIG. 6, the cartridge 241 further comprises a conducting end cap 249 for covering a first end of the tubular section 251. The conducting end cap 249 comprises cut-out sections to provide a seal between the conducting end cap 249 and the first ends 252 of the elongate tubular members 245 while enabling the lumens 253 of the elongate tubular members 245 to be accessible through the first ends 252 of the elongate tubular members 245. Preferably, the conducting end cap 249 is maintained in position about the first ends 252 of the elongate tubular members 245 by securing the conducting end cap 249 to the tubular section 247.

An insulating member 255 is also provided. The insulating member 255 comprises cut-out sections to provide a seal between the insulating member 255 and the second ends of the elongate tubular members 245 while enabling the lumens 253 of the elongate tubular members 245 to be accessible through the second ends of the elongate tubular members 245. The insulating member 255, together with the conducting end cap 249, serves to maintain the elongate tubular members 245 within the tubular section 247 of the cartridge 241.

A conducting member 257 is disposed over the second ends of the elongate tubular members 245 adjacent to the insulating member 255. Like the insulating member 255, the conducting member 257 comprises cut-out sections which enable the conducting member 257 to fit over the second ends of the elongate tubular members 245. The conducting member 257, however, further comprises a nipple 258 formed along the circumference of each cut-out section on the conducting member 257. The nipples 258 extend from the conducting member 257 into the lumens 253 of the elongate tubular members 245. Accordingly, the nipples 258 provide electrical contact with the conducting layers 212 of the elongate tubular members 245 while enabling the lumens 253 of the elongate tubular member 245 to be accessible through the second ends of the elongate tubular members 245.

A retaining ring 260 may be used to maintain the insulating member 255 and the conducting member 257 in position about the second ends of the elongate tubular members 245. Toward that end, the retaining ring 260 can be equipped with internal threads which mate with external threads along the exterior of the second end 262 of the tubular section 247 for securing the retaining ring 260 to the tubular section 247.

The tubular section 247, the conducting end cap 249, the insulating member 255, and the outer surfaces of the elongate tubular members 245 define a sealed receptacle for holding the electrolytic solution. When the electrolytic solution is contained within the receptacle, the electrolytic solution is in contact with the pores 219 of the elongated tubular members 245 while remaining electrically isolated from the conducting layer 212.

A convertor is connected between the conducting end cap 249 and the conducting member 257 via electrical leads 264. Accordingly, the conducting end cap 249 acts as an electrode providing an electrical connection between any electrolytic solution contained within the receptacle and a first terminal of the convertor. Similarly, the conducting member 257 also acts as an electrode, forming an electrical connection between the conducting layer 212 and a second terminal of the convertor.

Figure 3:
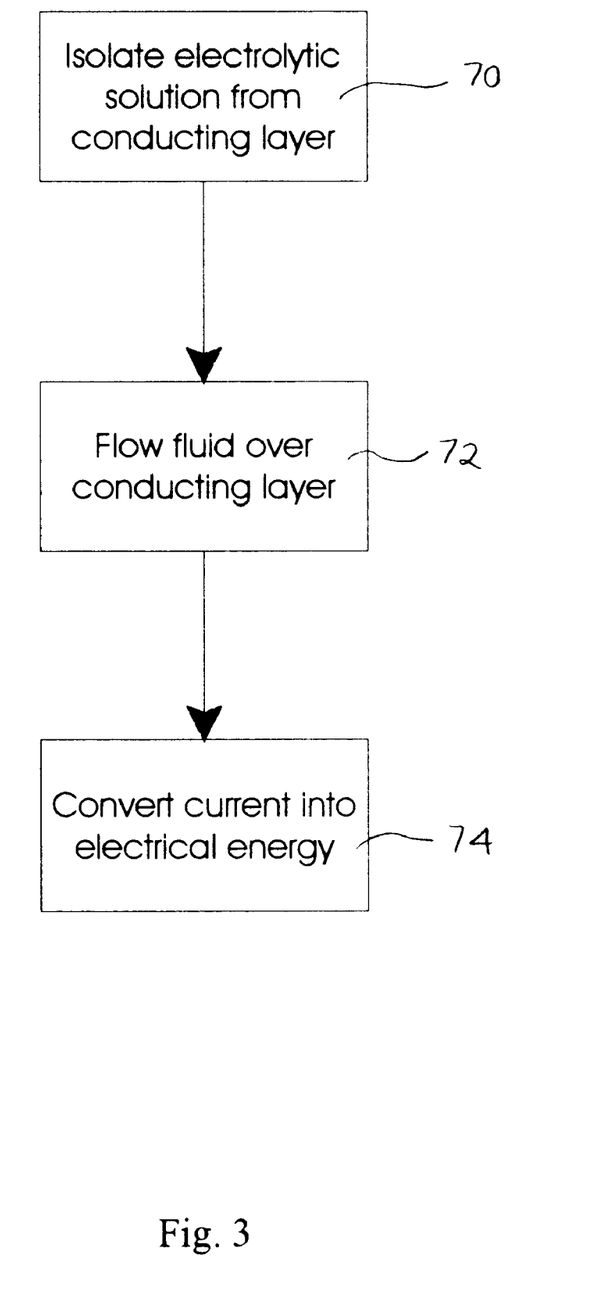
FIG. 3 is a flow chart showing the steps of a method for generating electrical energy in accordance with the present invention.

The steps for generating electrical energy using the apparatuses 10, 110, and 210 are depicted in FIG. 3. At step 70, an electrolytic solution comprising a charged species is maintained along a first side of a conducting layer while still being electrically isolated from the conducting layer. In apparatuses 10 and 210, the electrolytic solution is contained within the receptacles 16 and 216, respectively, so that the insulating layers 14 and 214, electrically isolate the electrolytic solution. In apparatus 110, the generator is merely positioned over a source of electrolytic solution with the insulating layer 114 electrically isolating the electrolytic solution.

A fluid, such as air or water, is then flowed over the conducting layer at step 72. In apparatuses 10 and 110, the fluid is simply flowed over the exposed conducting layers, 12 and 112, respectively. In apparatus 210, the fluid is passed through the second open end 231 of the housing 228, into the lumens 253 of the elongate tubular members 245, and out through the first open end 230 of the housing 228.

In each apparatus, the movement of the fluid over the pores, 19, 119, or 219, of the conducting layer, 12, 112, or 212, causes a reduced pressure region or pressure differential across the pores, 19, 119, or 219. This pressure difference draws mobile charged particles in the electrolytic solution into the pores, 19, 119, or 219. Provided that the polarity of the mobile charged particles is opposite to the polarity of the fixed surface charge on the exposed sections of the insulating layer, or the insulating and conducting layers, a streaming potential and current is produced from the charge separation produced by the mobile charged particles. One side of the potential difference is supported by the conducting layer, 12, 112, or 212, while the other side of the potential difference is supported by the electrolytic solution.

The current is harnessed by the convertor to generate electrical energy at step 74. The current is collected by a first electrode, 22 or 249, in contact with the electrolytic solution and a second electrode, 24 or 257, in contact with the conducting layer, 12, 112, or 212. The power generated is given by the following formula:

$$\text{Power} \sim \frac{\pi a^2 \sigma^2 d^2 \rho^2 v^4}{4\eta^2 \kappa l} \times P \qquad \text{Eqn. 1}$$

wherein "a" is the pore diameter, "$\sigma$" is the charge density of the fixed surface charge of the pore, "d" is the average separation between the fixed surface charge and the charged species of the electrolytic solution, "$\rho$" is the fluid density, "v" is the fluid velocity, "$\eta$" is the viscosity of the electrolytic solution, "$\kappa$" is the conductivity of the electrolytic solution, "l" is the pore length, and "P" is the total number of pores. The apparatus in accordance with the present invention is preferably designed to produce the largest possible transduction for small wind cross sections, thereby enabling the apparatus to be effective even for small buildings. Accordingly, since power production increases as the fourth power of fluid velocity, the apparatus of the present invention is designed to produce the largest fluid velocity along the surface to create the largest pressure differential. Additionally, the largest surface density of operational pores is desired to produce the most efficient energy transduction. Further, using a low conductivity electrolyte will beneficially affect the efficiency of the apparatus. For example, an electrolyte comprising highly charged latex spheres has a low conductivity compared to an equal number of small univalent ions. The use of an electrolytic solution comprising charged latex spheres is also beneficial in that the large spheres are able to displace a significant counterion charge and the large size of the particles means that the particles are less likely to be drawn entirely through the pores to be swept away by the fluid flow. An addition of an anti-freeze solution to the electrolytic solution can further help to lower the conductivity of the electrolytic solution while also preventing the solution from freezing. Additionally, minimizing the pore length, 1, will increase the power output of the apparatus.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An apparatus for generating electrical energy comprising:
   a. a generator comprising:
      i. a conducting layer;
      ii. means to supply an electrolytic solution;
      iii. an insulating layer for electrically isolating the electrolytic solution from the conducting layer; and iv. a plurality of pores extending through the conducting and the insulating layers forming exposed sections of the insulating layer and the conducting layer within the pores, wherein exposed sections of the insulating layer within the pores are charged;

b. a first electrode operatively connected with the conducting layer;

c. a second electrode operatively disposed to contact the electrolytic solution; and d. a convertor connected between the first and the second electrodes for converting a current flowing through the first and second electrodes into electrical energy.

2. The apparatus of claim 1 wherein the means to supply an electrolytic solution comprises a receptacle for storing the electrolytic solution.

3. The apparatus of claim 2 wherein the insulating layer is disposed along an interior surface of the receptacle.

4. The apparatus of claim 1 wherein the conducting layer and the insulating layer are formed as a generally planar sheet.

5. The apparatus of claim 1 wherein the conducting layer and the insulating layer are formed as an elongate tubular member.

6. The apparatus of claim 5 wherein the conducting layer forms an interior surface of the elongate tubular member and the insulating layer forms an outer surface of the elongate tubular member.

7. The apparatus of claim 1 wherein the insulating layer is composed of a material having a surface charge.

8. The apparatus of claim 1 further comprising a coating including a charged material disposed along the exposed sections of the insulating layer and the conducting layer within the pores.

9. An apparatus for generating electrical energy comprising:

a. a housing having a first and a second open end, the housing defining an interior chamber and being constructed and arranged to be positioned in a stream having a fluid flow;

b. a cartridge, positioned within the chamber of the housing, comprising:

i. a generally tubular section;

ii. a receptacle for holding an electrolytic solution;

iii. an elongate tubular member disposed within the tubular section with a longitudinal axis of the elongate tubular member generally parallel to a longitudinal axis of the tubular section, the elongate tubular member comprising:

(1) a conducting layer forming an interior surface of the elongate tubular member;

(2) an insulating layer forming an outer surface of the elongate tubular member for electrically isolating the electrolytic solution from the conducting layer; and (3) a plurality of pores extending through the conducting and insulating layers forming exposed sections of the insulating layer and the conducting layer within the pores, wherein exposed sections of the insulating layer within the pores are charged;

iv. an insulating end cap for covering a first end of the tubular section, the insulating end cap having a cut-out section to provide a seal between the insulating end cap and a first end of the elongate tubular member while enabling a lumen of the elongate tubular member to be accessible through the first end of the elongate tubular member;

v. an insulating member having a cut-out section to provide a seal between the insulating member and a second end of the elongate tubular member while enabling the lumen of the elongate tubular member to be accessible through the second end of the elongate tubular member; and vi. a conducting member disposed over the second end of the elongate tubular member, the conducting member providing electrical contact with the conducting layer of the elongate tubular member;

wherein the tubular section, the insulating end cap, the insulating member, and the outer surface of the elongate tubular member define the receptacle for holding the electrolytic solution; and c. a convertor, having a first terminal connected to the conducting member and a second terminal operatively connected to contact the electrolytic solution, for converting a current flowing through the conducting member and the electrolytic solution into electrical energy.

10. The apparatus of claim 9 wherein the second end of the housing has a larger cross-sectional area than the first end of the housing.

11. The apparatus of claim 9 further comprising a stand for positioning the housing generally parallel to a direction of flow of a fluid.

12. The apparatus of claim 11 wherein the stand comprises a rotational mount for enabling the housing to be rotated.

13. The apparatus of claim 12 wherein the stand further comprises a vane for rotating the housing in response to the flow of fluid in the stream so that the housing is maintained generally parallel to the direction of flow of the fluid.

14. The apparatus of claim 13 wherein the second end of the housing has a larger cross-sectional area than the first end of the housing.

15. The apparatus of claim 14 wherein the vane rotates the housing in response to the fluid so that the second end of the housing is directed upstream of the flow of the fluid.

16. The apparatus of claim 9 further comprising a filter disposed over the second end of the housing.

17. A method for generating electrical energy comprising the steps of:

providing a conducting layer;

disposing an insulating layer adjacent to the conducting layer;

producing a plurality of pores that extend through the conducting layer and insulating layers to form exposed sections of the insulating layer and conducting layer;

placing an electrolytic solution in proximity to the insulating layer;

connecting a first electrode to the conducting layer;

contacting the electrolytic solution with a second electrode;

connecting the first and second electrodes to a converter for converting a current flowing through the first and second electrodes into electrical energy; and flowing a fluid over the conducting layer.

18. The method of claim 17 wherein a liquid is flowed over the conducting layer.

19. The method of claim 17 wherein a gas is flowed over the conducting layer.

* * * * *